US007822430B2

United States Patent
Yoon et al.

(10) Patent No.: US 7,822,430 B2
(45) Date of Patent: Oct. 26, 2010

(54) ULTRA WIDE BAND DEVICE AND DETECT-AND-AVOID METHOD THEREOF

(75) Inventors: Byung-tae Yoon, Yongin-si (KR); Young-eil Kim, Yongin-si (KR); Chang-won Jung, Yongin-si (KR); Se-hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 11/651,593

(22) Filed: Jan. 10, 2007

(65) Prior Publication Data

US 2008/0045175 A1 Feb. 21, 2008

(30) Foreign Application Priority Data

Aug. 18, 2006 (KR) .................. 10-2006-0078345

(51) Int. Cl.
*H04B 7/00* (2006.01)
(52) U.S. Cl. .................. 455/512; 455/514; 455/63.1; 455/67.11; 455/191.2
(58) Field of Classification Search ............ 455/512, 455/513, 514, 63.1, 67.11, 67.13, 78, 226.1, 455/226.2, 226.3, 188.1, 191.1, 192.2
See application file for complete search history.

(56) References Cited

U.S. PATENT DOCUMENTS

| 7,313,086 | B2 * | 12/2007 | Aizawa ................ 370/208 |
| 2004/0048574 | A1 * | 3/2004 | Walker et al. ............ 455/63.1 |
| 2005/0159109 | A1 * | 7/2005 | Kivekas et al. .......... 455/67.11 |

* cited by examiner

*Primary Examiner*—Yuwen Pan
(74) *Attorney, Agent, or Firm*—Sughrue Mion, PLLC

(57) ABSTRACT

An ultra wide band (UWB) device and a detect and avoid (DAA) method thereof are provided. The UWB device includes a detect and avoid (DAA) module block which detects a strength of radio signals received in a plurality of channels and determines communicability of the channels; a multitone generation block which generates a plurality of frequencies corresponding to the plurality of the channels and outputs one of the plurality of frequencies; and a controller which controls the multitone generation block to generate frequencies of an available channel which is determined to be communicable by the DAA module block. The method includes detecting a strength of radio signals received in a plurality of channels; determining communicability of the channels according to the detected strength of the radio signals; generating frequencies corresponding to a channel which is determined to be communicable; and transmitting or receiving a signal using the generated frequencies.

32 Claims, 3 Drawing Sheets

ULTRA WIDE BAND DEVICE AND DETECT-AND-AVOID METHOD THEREOF

CROSS-REFERENCE TO RELATED APPLICATIONS

This application claims priority from Korean Patent Application No. 10-2006-0078345 filed on Aug. 18, 2006, in the Korean Intellectual Property Office, the entire disclosure of which is incorporated herein by reference.

BACKGROUND OF THE INVENTION

1. Field of the Invention

Apparatuses and methods consistent with the present invention relate to an ultra wide band (UWB) device and a detect-and-avoid (DAA) method thereof, and more particularly, to an UWB device and a DAA method thereof which guarantees communication quality by avoiding interference with another device when transmitting and receiving UWB radio signals.

2. Description of the Related Art

Ultra wide band (UWB) is a wireless communication technology used to transmit and receive data through wireless access to PC, peripherals and/or home appliances in a limited space such as an office or home. UWB-applicable devices include almost every electronic product commonly used, such as a portable storage device, a printer, a camera, a mobile terminal, a game console, a vehicle, a computer, a speaker, a video device, and television (TV).

According to its characteristic, the UWB communicates using short pulses and enables information delivery at a very high rate of hundreds of megabits per second (Mbps) over a short range, for example within 10 m, using a wide frequency band of 500 MHz or so.

The frequency band of the UWB is divided into a lower band of about 3 GHz~about 5 GHz and an upper band of about 6 GHz~about 10 GHz. Band between the lower band and the upper band is unoccupied to avoid interference with existing wireless LAN (IEEE 802.11a) communications.

The lower band faces an interference problem with existing wireless service frequencies, and such interference may cause performance degradation of the existing wireless services. To prevent this, it is mandatory in every country, except the U.S.A., to adopt a detect-and-avoid (DAA) method in the lower band of the UWB band to protect existing wireless services. Yet, the DAA introduction has used some (e.g., about 4.2 GHz~about 4.8 GHz in South Korea) of the lower band for several years for the sake of development of the DAA technology.

UWB communication technology can be divided to multiband orthogonal frequency division multiplexing (MB-OFDM) and direct sequence code division multiple access (DS-CDMA). The MB-OFDM splits the lower band into a plurality of sub-channels of about 500 MHz bandwidth and communicates through the frequency hopping between the bands, whereas the DS-CDMA splits the UWB frequency band to two bands and substitutes a bit string of each band with a 24-bit codeword. The MB-OFDM divides the lower band to three channels by 528 MHz as shown in FIG. 1. The width of the channel may differ in different countries.

However, while transmitting and receiving radio signals by selecting a channel through frequency hopping, when radio signals are transmitted and received to and from another device in the same channel, a device communicating using MB-OFDM suffers signal interference with another device. To avoid this, it is required to lower the transmit (Tx) output below −70 dBm/MHz which is the minimum output of the UWB band. However, with this low output, it is hard to accomplish high speed communication which is a goal of UWB communication. Hence, related art UWB communications employing the DAA method do not permit the frequency hopping which is used practically in MB-OFDM.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, an ultra wide band (UWB) device includes a detect-and-avoid (DAA) module block which detects a strength of radio signals received in a plurality of channels and determines communicability of the channels; a multitone generation block which generates a plurality of frequencies corresponding to the plurality of the channels and outputs one of the plurality of frequencies; and a controller which controls the multitone generation block to generate frequencies of an available channel which is determined to be communicable by the DAA module block.

The DAA module block may include a received signal strength detector which detects the strength of the radio signals received in each channel; and an interference determiner which determines whether there is communication interference using the detected signal strength.

The communication interference may be communication interference with another device.

The interference determiner may determine that the communication interference occurs in a corresponding channel when the strength of the radio signals received in the corresponding channel is within a range of the radio signal power.

The interference determiner may determine whether there is communication interference based on a comparison of the strength of the radio signals received in a corresponding channel with a maximum transmit (Tx) output threshold, and a minimum Tx output threshold when DAA is used.

The interference determiner may determine that communication interference occurs in a corresponding channel when the strength of the radio signals received in the corresponding channel is between the minimum Tx output threshold and the maximum Tx output threshold.

The minimum Tx output threshold may be determined by subtracting a minimum threshold signal to interference ratio from a Tx output which enables communication in a UWB frequency band without using DAA.

The maximum Tx output threshold may be determined by adding a minimum threshold signal to interference ratio to an upper bound of a Tx output range in the UWB frequency band.

The multitone generation block may include a band selector which stores available channels which are determined to be communicable; and a multitone generator which generates the frequencies of the available channels.

The multitone generator may comprise a plurality of phase locked loops (PLLs) which generate different frequencies.

The band selector may select one of the available channels and operate the PLLs of the multitone generator to output frequencies of the selected channel.

The DAA module block may further include a switch which connects an antenna to either the received signal strength detector or the band selector.

The switch may connect the antenna to the received signal strength detector upon receiving a communication request.

The switch may connect the antenna to the band selector when the available channels are stored by the band selector.

The UWB device may further include a plurality of down mixers which mix the frequencies generated by the multitone generator with the signal from the antenna to down-convert the mixed signals to baseband.

The UWB device may further include a signal selector which selectively outputs one of the signals output from the down mixers.

The signal output from the signal selector may be fed back to the received signal strength detector, and the interference determiner may determine whether there is communication interference while the signal is being received.

The controller may re-determine the communicability of the channels by switching the switch to connect the antenna to the received signal strength detector when determining whether there is communication interference while the signal is being received.

According to the aspect of the present invention, a DAA method of an UWB device includes detecting a strength of radio signals received in a plurality of channels; determining communicability of the channels according to the detected strength of the radio signals; generating frequencies corresponding to a channel which is determined to be communicable; and transmitting or receiving a signal using the generated frequencies.

BRIEF DESCRIPTION OF THE DRAWING FIGURES

These and other aspects of the present invention will become more apparent and more readily appreciated from the following description of exemplary embodiments thereof, with reference to the accompanying drawings, in which.

DETAILED DESCRIPTION OF EXEMPLARY EMBODIMENTS OF THE PRESENT INVENTION

Figure 1:
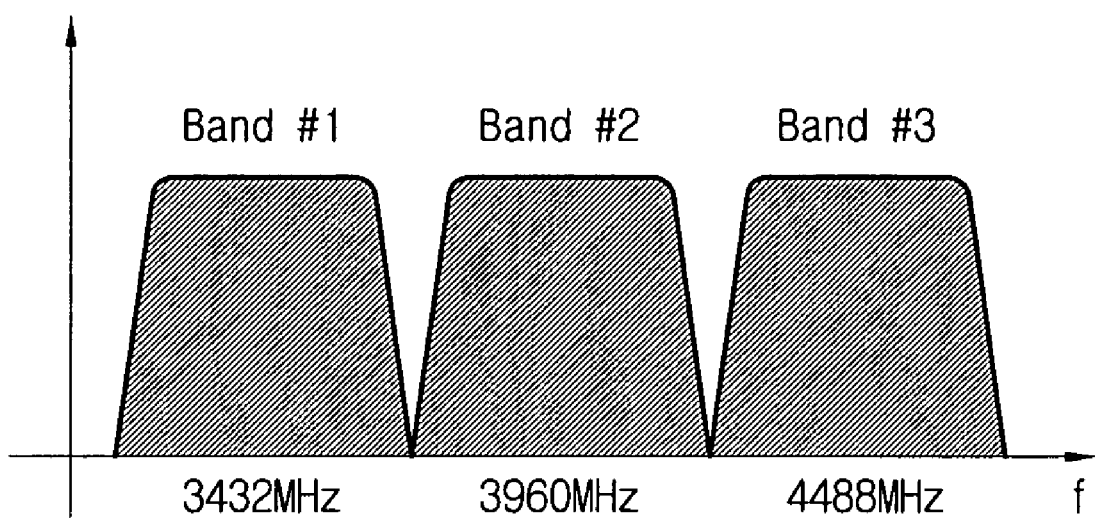
FIG. 1 is a diagram of a related art MB-OFDM lower band subdivided to a plurality of channels.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

Figure 2:
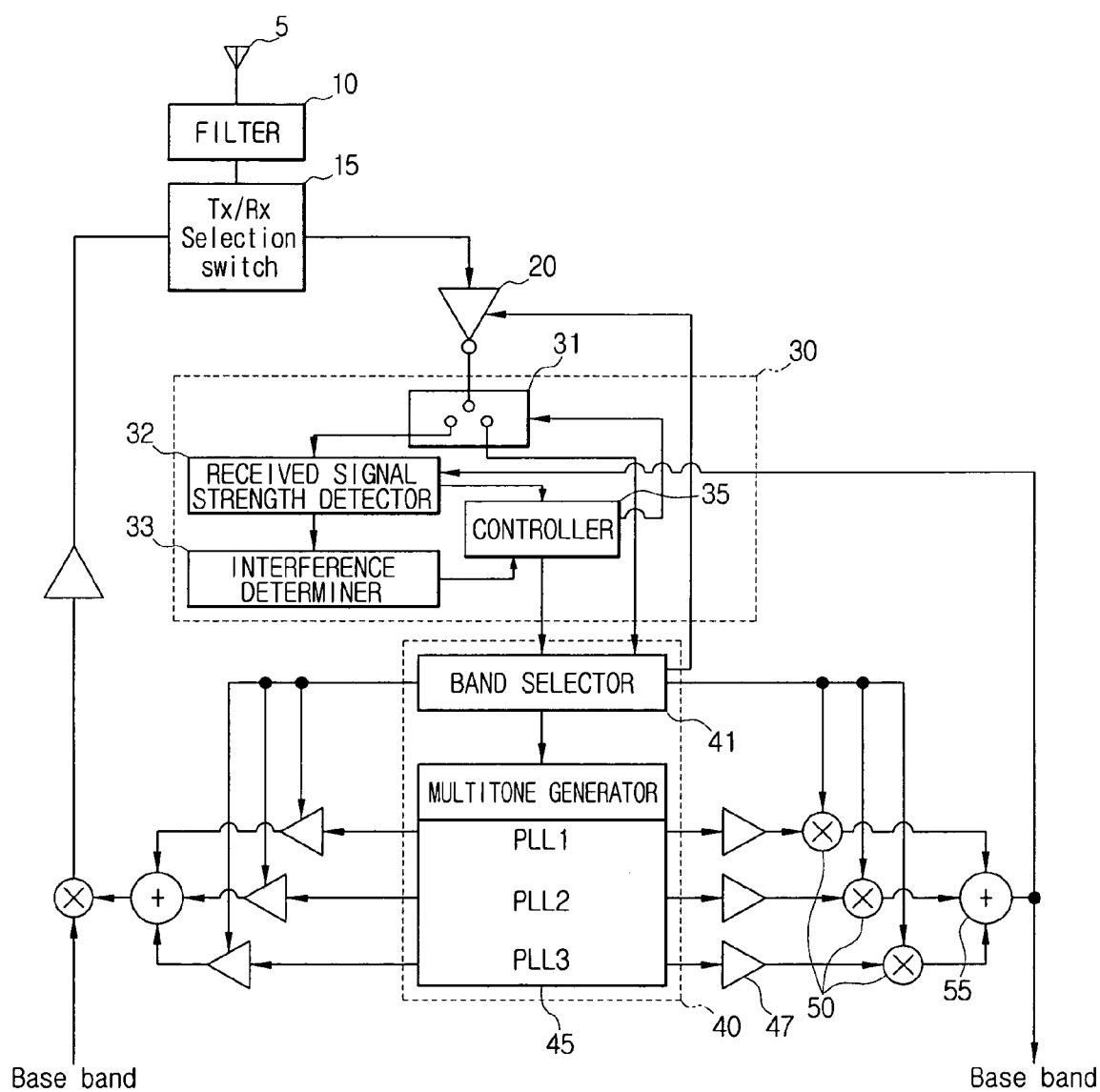
FIG. 2 is a block diagram of a UWB device according to an exemplary embodiment of the present invention.

FIG. 2 is a block diagram of a UWB device according to an exemplary embodiment of the present invention.

The UWB device checks whether there is communication interference with another device using the received signal strength of each channel in the communication request or the communication, and prevents the communication interference by determining the channel switching. The communication interference may be communication interference with another device.

The UWB device includes an antenna 5, a filter 10, a transmit/receive (Tx/Rx) selection switch 15, a low noise amplifier (LNA) 20, a DAA module block 30, a multitone generation block 40, and a controller 35.

The filter 10 filters radio signals to transmit or receive only UWB band signals via the antenna 5. The filter 10 is implemented using a tunable band pass filter (BPF). The filter 10 filters to input only frequencies corresponding to one of channels according to a control signal of the controller 35.

The Tx/Rx selection switch 15 selects one of a Tx circuit and a Rx circuit according to the transmission or the reception of the UWB radio signal.

The LNA 20 amplifies the received UWB radio signal according to a gain. The gain may be preset.

The DAA module block 30 determines communicability of each channel by detecting a strength of the radio signals received in the channels. The DAA module block 30 includes a switch 31, a received signal strength detector 32, an interference determiner 33, and the controller 35.

The switch 31 has a first contact connected to the DAA module block 30 and a second contact connected to the multitone generation block 40. The switch 31 sends the amplified radio signal from the LNA 20 to either the DAA module block 30 or the multitone generation block 40. The switch 31 is connected to the DAA module block 30 when determining the communicability of the channels, and connected to the multitone generation block 40 when processing the incoming radio signal. The channel communicability is determined, by way of example, when there is a communication request of the UWB device and when the received signal strength falls below a certain level during the communications.

The received signal strength detector 32 receives the radio signals received in the channels and detects the strength of the corresponding radio signals. It is noted that the received signal strength is a radiation output of the radio signal and may be expressed in dBm/MHz. The received signal strength detected at the received signal strength detector 32 is provided to the interference determiner 33.

The interference determiner 33 determines whether there is communication interference (i.e., signal interference) using the received signal strength. The communication interference may be interference with another device. Specifically, when the received signal strength $P_{rec}$ of the channel in which the radio signal is received ranges between a maximum transmit (Tx) output threshold $P_{max}$ and a minimum Tx output threshold $P_{min}$, the interference determiner 33 determines that communication interference exists in the corresponding channel. The communication interference may be communication interference with another device. Herein, the maximum Tx output threshold $P_{max}$ is an upper bound set by every country which has adopted the DAA, and the minimum Tx output threshold $P_{min}$ is a lower bound for communications of the received signal strength in the corresponding channel without using the DAA.

When the received signal strength of the input channel is between the maximum Tx output threshold $P_{max}$ and the minimum Tx output threshold $P_{min}$ as shown in Equation 1 (shown below), the interference determiner 33 determines the occurrence of the communication interference. When the strength of the radio signal is smaller than the minimum Tx output threshold $P_{min}$, it is determined that no communication is occurring. On the other hand, when the strength of the radio signal is greater than the maximum Tx output threshold $P_{max}$, the interference determiner 33 determines that no communication interference is occurring. In other words, the UWB radio signal does not interfere with another device even when another device is communicating.

$$P_{min} < P_{rec} < P_{max} \quad \text{[Equation 1]}$$

In Equation 1, the minimum Tx output threshold $P_{min}$ is determined by subtracting a minimum threshold signal to interference ratio (C/I) that produces a desired communication quality from the lower bound of the Tx output range defined in the UWB frequency band. Currently, the lower bound of the Tx output is about −70 dBm/MHz and the maximum value of the minimum threshold C/I is about 20 dBm/MHz. Thus, the minimum Tx output threshold is about −90 dBm/MHz or so. The minimum Tx output threshold $P_{min}$ is calculated by assuming that the distance between the UWB device and the receiver of another device is zero.

The maximum Tx output threshold $P_{max}$ is acquired by adding the minimum threshold C/I to the upper bound of the Tx output range defined in the UWB band. Currently, the upper bound of the Tx output is about −41.3 dBm/MHz. Accordingly, by adding the minimum threshold C/I, the maximum Tx output threshold $P_{max}$ is about −21.3 dBm/MHz.

Accordingly, when the received signal strength $P_{rec}$ of each channel meets the Equation 2 (shown below), the interference determiner 33 determines that communications interference exists. In other words, another device is transmitting the radio signal.

$$-70 - C/I < P_{rec} < -41.3 + C/I \quad \text{[Equation 2]}$$

The interference determiner 33 provides the result as to the interference of each channel based on Equation 2, to the controller 35.

It should be appreciated that the minimum Tx output threshold $P_{min}$ and the maximum Tx output threshold $P_{max}$ may increase or decrease depending on the change of the UWB standard, the standard of each country, and the minimum threshold C/I.

The controller 35 separates channels into available channels for communication and unavailable channels according to the determination result of the interference determiner 33, and provides the information relating to the available channels to the multitone generation block 40. According to the communication request and start, the controller 35 controls to turn on the first contact of the switch 31 upon the communication request by controlling the switching of the switch 31. After the communication commences, the controller 35 controls to turn on the second contact of the switch 31.

The multitone generation block 40 generates a plurality of frequencies corresponding to the channels. Upon the communication start, the multitone generation block 40 outputs frequencies of the available channel based on the provided information.

The multitone generation block 40 includes a band selector 41 and a multitone generator 45.

The band selector 41 stores the available channels and controls the multitone generator 45 to output the frequencies of the available channel.

The multitone generator 45 generates the plurality of frequencies corresponding to the channels. When the available channel is selected and the communication commences, the multitone generator 45 generates frequencies corresponding to one of the available channels under the control of the band selector 41.

The multitone generator 45 comprises a plurality of phase locked loops (PLLs) which produce different frequencies. In an exemplary embodiment of the present invention, since the lower UWB band is split into three sub-channels, the multitone generator 45 is implemented using three PLLs. However, the number of PLLs may be more or less than this. The band selector 41 selects one of the available channels and operates one of the PLLs of the multitone generator 45 to output the frequencies of the selected available channel.

An amplifier 47 and a plurality of down mixers 50 coupled to the PLLs are arranged at the end on the reception circuit of the multitone generator 45. At the back end of the down mixers 50, a signal selector 55 is placed to select one of the frequencies output from the down mixers 50. Thus, the frequencies generated at the multitone generator 45 are fed to and down-converted at the down mixers 50 to baseband and one of the converted baseband signals is selected at the signal selector 55. Next, the baseband signal is provided to the reception circuit.

Simultaneously, the signal output from the signal selector 55 is fed back to the received signal strength detector 32. The received signal strength detector 32 detects the strength of the feedback signal, and the interference determiner 33 determines whether the signal is interfered by comparing the detected signal strength with the maximum Tx output threshold $P_{max}$ and the minimum Tx output threshold $P_{min}$. When determining the interference with another device in a corresponding available channel, the controller 35 controls to change the available channel by issuing the control signal, or aborts the output and controls to retrieve the available channels when there is no available channel to change to.

Figure 3:
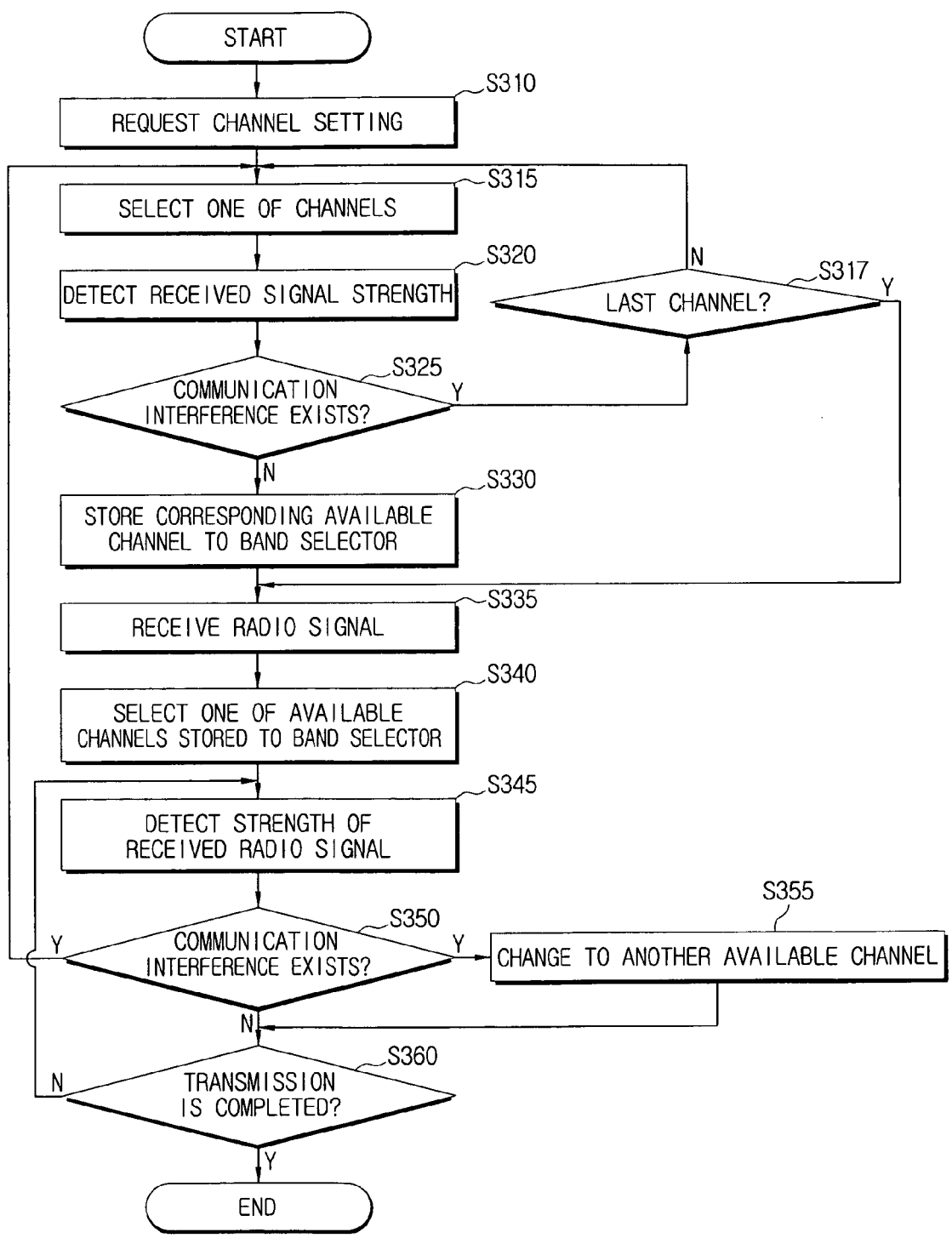
FIG. 3 is a flowchart outlining a DAA method, according to an exemplary embodiment of the present invention, executed by the UWB device of FIG. 2.

With the UWB device constructed above, the execution of the DAA method, according to an exemplary embodiment of the present invention, is illustrated in reference to FIG. 3.

When UWB device requests the channel setting to perform the radio communications (S310), the controller 35 controls to input the radio signal in the available channel by selecting one of the channels using the filter 10 (S315) and controls to feed the radio signal received via the antenna 5 to the received signal strength detector 32 by turning on the first contact of the switch 31. The received signal strength detector 32 detects the strength of the fed radio signal and provides the detected signal strength to the interference determiner 33 (S320). The interference determiner 33 determines whether there is communication interference in the corresponding channel by checking whether the strength of the fed radio signal lies between the maximum Tx output threshold $P_{max}$ and the minimum Tx output threshold $P_{min}$ based on Equation 2 (S325).

The interference determiner 33 provides the result to the controller 35. When it is determined that no interference in the corresponding channel exists, the controller 35 controls to store the channel as an available channel in the band selector by providing the information relating to the corresponding channel (S330).

When it is determined that communication interference exists at operation S325, the controller 35 checks whether the corresponding channel is the last channel belonging to the lower band (S317). When the corresponding channel is not the last channel, the controller 35 repeats the process to determine the communicability of the channels until the last channel is evaluated. For doing so, the controller 35 repeats to receive the signal in a different channel by varying the filtering region of the filter 10 and to determine the communicability of the corresponding channel. The information relating to the channel determined to be communicable through the repeated process is provided and stored to the band selector 41 as the available channel. In the mean time, when the last channel has been reached in the operation S317, the controller 35 proceeds to the operation S335.

Upon determining the communicability for every channel of the lower band, the controller 35 controls the switch 31 to turn on the second contact so as to receive the radio signal (S335). Next, the radio signal received via the antenna 5 is provided to the band selector 41, and the band selector 41 controls the multitone generator 45 to select one of the stored available channels and to produce frequencies of the corresponding available channel (S340). In doing so, the controller 35 controls the filter 10 to filter the radio signal of the corresponding available channel. The frequency of the corresponding available channel, which is output from the multitone generator 45, is provided to the down mixer 50 and down-converted to the baseband. The down-converted signal is fed to the reception circuit via the signal selector 55.

At the same time, the signal output from the signal selector 55 is provided to the received signal strength detector 32. The received signal strength detector 32 detects the strength of the signal (S345). The interference determiner 33 determines whether there is communication interference depending on whether the signal strength is between the minimum Tx output threshold $P_{min}$ and the maximum Tx output threshold $P_{max}$ (S350). When it is determined that the interference exists (S350-Y), the controller 35 can select and carry out one of the following two processes.

First, the controller 35 changes to another available channel of the communicable channels by issuing the control signal to the band selector 41 (S355), and controls the multitone generator 45 to output the frequencies of the changed channel.

Secondly, the controller 35 turns on the first contact of the switch 31 and re-determines the communicability of each channel. In this case, the operations from S315 are repeated.

The controller 35 checks whether the transmission is completed (S360). If the transmission is not completed, the controller 35 repeats operations S345 through S360 until the transmission is completed.

As such, the UWB device according to an exemplary embodiment of the present invention determines the communicability of the channels using the strength of the signal received in each channel, and transmits or receives the radio signal in the available channel which does not suffer from communication interference. The communication interference may be interference by another device. Also, the UWB device according to an exemplary embodiment of the present invention can prevent the radio signal interference by changing the available channel by constant monitoring of the signal strength during the communications or by repeating the retrieval of the available channels. This method can satisfy the DAA standard.

In light of the foregoing, communication interference can be prevented by communicating in the selected channel which does not suffer the interference and changing the channel or retrieving the interference-free channels even when the interference occurs during the communications.

While the present inventive concept has been particularly shown and described with reference to exemplary embodiments thereof, it will be understood by those skilled in the art that various changes in form and details may be made therein without departing from the spirit and scope of the invention as defined by the appended claims.

What is claimed is:

1. An ultra wide band (UWB) device comprising:
    a detect and avoid (DAA) module block which detects a strength of radio signals received in a plurality of channels and determines communicability of the channels, wherein the DAA module block comprises an interference determiner which determines whether there is communication interference based on a comparison of the strength of the radio signals received in a corresponding channel within an upper transmit output threshold and a lower transmit output threshold;
    a multitone generation block which generates a plurality of frequencies corresponding to the plurality of the channels and outputs one of the plurality of frequencies; and
    a controller which controls the multitone generation block to generate frequencies of an available channel which is determined to be communicable by the DAA module block,
    wherein the radio signals include UWB radio signals.

2. The UWB device as in claim 1, wherein the DAA module block comprises:
    a received signal strength detector which detects the strength of the radio signals received in each channel.

3. The UWB device as in claim 2, wherein the interference determiner determines whether there is communication interference with another device using the detected signal strength.

4. The UWB device as in claim 2, wherein the interference determiner determines that the communication interference occurs in a corresponding channel when the strength of the radio signals received in the corresponding channel is within a range of the radio signal power.

5. The UWB device as in claim 2, wherein the interference determiner determines whether there is communication interference based on a comparison of the strength of the radio signals received in a corresponding channel with a maximum transmit (Tx) output threshold and a minimum Tx output threshold, when DAA is used.

6. The UWB device as in claim 5, wherein the interference determiner determines that the communication interference occurs in a corresponding channel when the strength of the radio signals received in the corresponding channel is between the minimum Tx output threshold and the maximum Tx output threshold.

7. The UWB device as in claim 5, wherein the minimum Tx output threshold is determined by subtracting a minimum threshold signal to interference ratio, from a Tx output which enables communication in a UWB frequency band without using DAA.

8. The UWB device as in claim 5, wherein the maximum Tx output threshold is determined by adding a minimum threshold signal to interference ratio to an upper bound of a Tx output range in the UWB frequency band.

9. The UWB device as in claim 2, wherein the DAA module block further comprises:
    a switch which connects an antenna to one of the received signal strength detector and a band selector which stores available channels.

10. The UWB device as in claim 9, wherein the switch connects the antenna to the received signal strength detector upon receiving a communication request.

11. The UWB device as in claim 9, wherein the switch connects the antenna to the band selector when the available channels are stored by the band selector.

12. The UWB device as in claim 9, wherein the controller re-determines the communicability of the channels by switching the switch to connect the antenna to the received signal strength detector when determining whether there is interference while the signal is being received.

13. The UWB device as in claim 1, wherein the multitone generation block comprises:
    a band selector which stores available channels which are determined to be communicable and which is connected to an antenna; and a multitone generator which generates the frequencies of the available channels.

14. The UWB device as in claim 13, wherein the multitone generator comprises a plurality of phase locked loops (PLLs) which generate different frequencies.

15. The UWB device as in claim 10, wherein the band selector selects one of the available channels and operates the plurality of PLLs of the multitone generator to output frequencies of the selected channel.

16. The UWB device as in claim 13, further comprising:
a plurality of down mixers which mix the frequencies generated by the multitone generator with the signal from the antenna to down-convert the mixed signals to baseband.

17. The UWB device as in claim 16, further comprising:
a signal selector which selectively outputs one of the signals output from the down mixers.

18. The UWB device as in claim 17, wherein the signal output from the signal selector is fed back to the received signal strength detector, and the interference determiner determines whether there is interference while the signal is being received.

19. The UWB device as in claim 1, wherein the DAA module block comprises:
a received signal strength detector which detects the strength of the radio signals received in each channel; and
a switch which connects an antenna to one of the received signal strength detector and a band selector which stores available channels.

20. The UWB device as in claim 1, wherein the multitone generation block comprises a band selector which stores available channels which are determined to be communicable and which is connected to an antenna, the UWB device further comprising:
a plurality of down mixers which mix the frequencies of the available channels with the signal from the antenna to down-convert the mixed signals to baseband; and
a signal selector which selectively outputs one of the signals output from the down mixers.

21. A detect and avoid (DAA) method of an ultra wide band (UWB) device, the method comprising:
detecting a strength of radio signals received in a plurality of channels;
determining communicability of the channels according to the detected strength of the radio signals;
determining whether there is communication interference based on a comparison of the strength of the radio signals received in a corresponding channel within an upper transmit output threshold and a lower transmit output threshold;
generating frequencies corresponding to a channel which is determined to be communicable; and
transmitting or receiving a signal using the generated frequencies,
wherein the radio signals include UWB radio signals.

22. The DAA method as in claim 21, further comprising:
determining whether there is communication interference using the detected strength of the radio signals.

23. The DAA method as in claim 22, wherein the communications interference is interference with another device.

24. The DAA method as in claim 22, wherein the determining of whether there is communication interference comprises determining that there is communication interference in a corresponding channel when the strength of the received radio signals in the corresponding channel is within a range of the radio signal power.

25. The DAA method as in claim 22, wherein the determining whether there is communication interference comprises determining that there is communication interference based on a comparison of the strength of the received radio signals in a corresponding channel with a maximum (transmit) Tx output threshold and a minimum Tx output threshold, when DAA technique is used.

26. The DAA method as in claim 25, wherein the determining whether there is communication interference comprises determining that there is communication interference in a corresponding channel when the strength of the received radio signals in the corresponding channel is between the minimum Tx output threshold and the maximum Tx output threshold.

27. The DAA method as in claim 25, wherein the minimum Tx output threshold is determined by subtracting a minimum threshold signal to interference ratio which is a signal to interference ratio which provides a certain quality of communication from a Tx output which enables communication in a UWB frequency band without using DAA.

28. The DAA method as in claim 25, wherein the maximum Tx output threshold is determined by adding a minimum threshold signal to interference ratio which is a signal to interference ratio which provides a certain quality of communication to an upper bound of a Tx output range in the UWB frequency band.

29. The DAA method as in claim 21, further comprising:
down-converting the signal to baseband by mixing the frequencies of the channel which is determined to be communicable with the signal.

30. The DAA method as in claim 29, further comprising:
detecting a signal strength of the down-converted signal; and
determining whether there is communication interference in the channel which is determined to be communicable according to the detected signal strength.

31. The DAA method as in claim 30, further comprising:
changing the channel to another channel which is determined to be communicable when it is determined that there is communication interference.

32. The DAA method as in claim 30, further comprising:
re-determining the communicability of the channels when it is determined that there is communication interference.

* * * * *